United States Patent [19]
Broche et al.

[11] 3,879,105
[45] Apr. 22, 1975

[54] TELESCOPE WITH AN IMAGE REVERSING SYSTEM

[75] Inventors: Werner Broche; Albert Ignatius, both of Jena; Günter Brand, Schalkau; Adolf Stirzel, Hildburghausen/Haselrieth; Wilhelm Storch, Eisfeld, all of Germany

[73] Assignee: Jenoptik Jena G.m.b.H, Jena, Germany

[22] Filed: Apr. 4, 1974

[21] Appl. No.: 457,034

[52] U.S. Cl. ............... 350/51; 350/36; 350/287
[51] Int. Cl. ............................................ G02b 23/02
[58] Field of Search .................. 350/50, 51, 287, 36

[56] References Cited
UNITED STATES PATENTS

| | | | |
|---|---|---|---|
| 2,463,959 | 3/1949 | Flint | 350/51 |
| 2,940,359 | 6/1960 | Rantsch | 350/36 |
| 3,049,972 | 8/1962 | Malinowski | 350/287 |

*Primary Examiner*—David H. Rubin

[57] ABSTRACT

In the housing of a telescope, there is arranged an image reversing system between an ocular and an objective, comprising two prisms, one of which being displaceable in four degrees of freedom. The combination of two of such telescopes can be used in binoculars.

4 Claims, 3 Drawing Figures

TELESCOPE WITH AN IMAGE REVERSING SYSTEM

The invention is in concern of a telescope with an image reversing system, particularly for use in binoculars. The system includes at least two optical members, at least one of which being adjustable, and is arranged between an objective and an ocular.

The prism or prism system in previous prism telescopes or binoculars are adjustable in two directions at right angles to each other and to the optical axis, permitting a parallel alignment of the telescope axes and a centering of the entrance pupil relative to the exit pupil, however, a correction with respect to the position of the image plane when the image is completely reversed cannot be carried out.

Furthermore, it is known that the angle errors in prisms and the disalignment of the imaging optical members, which oppose the image fusion in binocular telescope, can be compensated by rotation or displacement of the optical elements in planes at right angles to the telescope axes. Apart from the fact that such an adjustment includes variations of the positions of more than one optical member, variations in the focal length and in the intercept length in the telescope objective, which are caused by the different light paths in the glass material cannot be compensated.

It is an object of the present invention to obviate the above disadvantages.

It is a further object of the present invention to provide a telescope image reversing system, which permits a fast and precise adjustment of a telescope by displacement of only one optical member.

It is a final object of the present invention to provide an image reversing system, the mounting means of which due to the kind of adjustment, permits an economical and none too precise production, without affecting the precision of the telescope itself.

Accordingly, the present invention relates to a telescope with an image reversing system, arranged between an objective and an ocular, comprising at least two optical members, at least one of said members being adjustable, characterized in that the optical member is displaceable in two planes at right angles relative to each other and tiltable about two axes in right angular relation and in that one of said planes of displacement and one of the tilting axes are substantially in parallel with the optical axis of the telescope.

By virtue of the inventional arrangement the displacement of a single member in different directions effects an adjustment of the focal length, the image reversion, the alignment of the pupils in a telescope, and a parallel alignment of the two optical axes, in the case of binoculars. Such a kind of adjustment has the advantage that due to reasonable requirements set to the tolerances of the single members and a central adjustment, the production process can easily be controlled and unforeseen risks can be avoided.

This in turn results in instruments which, economically produced, offer a high optical quality at stable parameters. In non-displaceably connecting the one prism to the housing of the device, and in seating said prism on both of its cathetus faces, the theoretical given entrance and exit pupil of the optical bundle of light is kept to narrow tolerances, in the frame of the precision which is given by the mechanical working of the original form.

A further advantage resulting therefrom is that assembly errors due to manual work, and departures from seating measures are avoided in the course of the assembly operation.

It is a further advantage that the axis of rotation of the adjusted prism is in alignment with the ocular axis, so that no image displacement will occur in the course of rotating the prism about the axis of rotation in spite of an errorless adjustment in the image plane of the ocular.

In order to keep the optical member in the adjusted position, said member can preferably be arrested in any rotated or tilted position.

A further improvement particularly with respect to production technology consists in a support including five selected points, on which the optical elements, preferably prisms, are seated.

Thus it is possible to obtain a safe and precise seating of prisms in mounts, which have been produced by casting and forming.

In order that the invention may be more readily understood reference is made to the accompanying drawings which illustrate diagrammatically and by way of example one embodiment thereof and in which.

Figure 1:
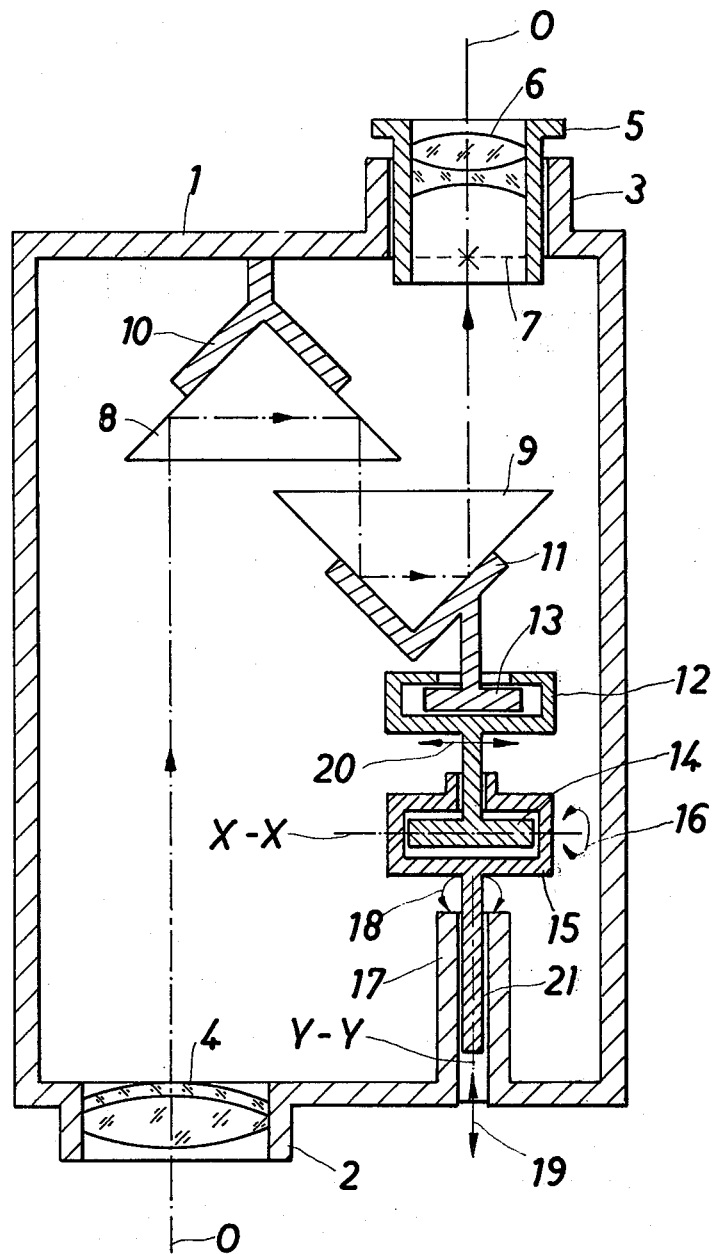
FIG. 1 is a sectional view of a telescope along the telescope axis.

In FIG. 1, a housing 1 is provided with an objective flange 2 and an ocular flange 3 for receiving an objective 4, and an ocular 6, respectively, in an ocular mount 5. The objective 4 and the ocular 6 are members of a telescope with an ocular image plane 7 and a folded optical axis O—O. The ocular 6 is displaceable by means of its mount 5 relative to the flange 3 and parallel to the optical axis.

Two right angle prisms 8 and 9 are arranged, according to the Poro-Prism system of the first order, between the objective 4 and the ocular 6, in order to fold the telescope beam path.

The prism 8 is seated on a prism mount 10 which is non-displaceably connected to the housing 1.

The prism 9 is secured to a prism mount 11, which in turn is connected to a slide 13, moveable in a guide 12 in the directions indicated by a double arrow 20. Said guide 12 is rigidly connected to a seating 14, which can be tilted in a seating body 15 about an axis X—X in the manner indicated by a double arrow 16.

Via a trunnion 21 integral with the seating body 15 the latter is both tiltable about an axis Y—Y indicated by a double arrow 18 and displaceable in the direction indicated by the double arrow 19 in a sleeve bearing 17 fast with the housing 1.

The axes X—X and Y—Y are at right angles to each other. The axis Y—Y is substantially in parallel with the portion of the optical axis O—O which lies in the vicinity of the objective 4 and the ocular 6, respectively.

Figure 2:
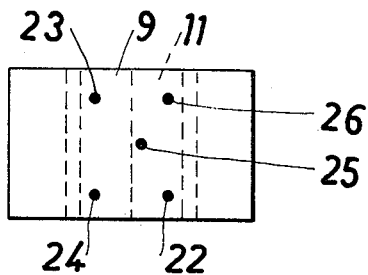
FIG. 2 shows a prism seated in a prism mount.

FIG. 2 shows five seating points 22, 23, 24, 25, 26 for seating the prism 9 on the prism mount 11.

Figure 3:
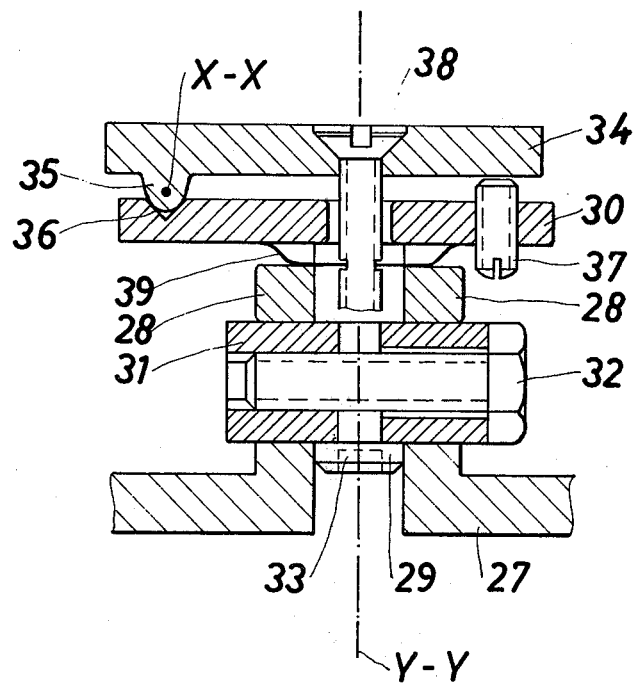
FIG. 3 is an embodiment of a device for adjusting a prism.

In FIG. 3 a housing 27 is embodied as a bearing collar 28 in which a pinion 29 is seated which in turn is fast to a disc 30, having an axis Y—Y.

The bearing collar 28 is provided with a clamping means 31 adapted to arrest the pinion 29 by means of a screw 32. The pinion 29 is provided with a recess 33 for insertion of an adjustment tool (not shown).

A prism mount 34 on its one end portion is pivotably connected to the disc 30 by means of a bull-nose 35 inserted into a V-shaped recess 36, and, on the other end portion, rests upon an adjustable screw 37 in said disk 30, the axis of which is substantially parallel to the axis Y—Y.

The prism mount 34 and the disk 30 have central bores, in which a screw 38 is fitted for engagement with the pinion 29.

An annular spring 29, which abuts against said bearing collar 28 and the disc 30, counteracts the effect of the screw 38.

A distant object (not shown) is imaged through the objective 4 via prisms 8 and 9 in a plane in which the ocular 6 is focussed by axial displacement thereof.

In this manner the object plane of the ocular 6 is coincident with the image plane of the objective 4, the common plane is the ocular image plane 7.

The prism 9 is displaceable parallel to its hypotenuse in the direction indicated by the double arrow 20 by means of the slide 13 in the guide 12.

Furthermore, the prism 9 is tiltable in the direction indicated by the double screw 16 about the axis X—X by virtue of the seating 14 in the body 15.

A further displacement of the prism 9 is obtained by moving the pinion 21 in the sleeve bearing 17 in parallel to the axis Y—Y as indicated by a double arrow 19.

The displacements of the prism 9 in any of the directions stated hereinbefore can be eliminated by employment of respective arresting means, however, permitting the independent movement in one or several directions. By its bull-nose portion 35 seated in the V-shaped groove 36, the prism mount 34 is displaceable at right angles to the drawing plane of FIG. 3.

The screw 37 is adapted to tilt the prism mount 34 relative to the disc 30, about the axis Y—Y and about the axis X—X which is at right angles to the drawing plane. Having been adjusted parallel and/or at right angles to the drawing plane, the prism mount 34 is nondisplaceably connected with the disc 30 by means of the screw 38, in which the spring 39 secures the connection.

A pinion 29 is arranged in the seating 28 for being tilted about and displaced in parallel to the axis Y—Y. After the pinion 29 has been tilted and/or displaced as desired the screw 32 of the clamping means 31 is tightened to ensure a non-displaceable connection of the pinion 29 with and relative to the seating 28.

We claim:

1. A telescope comprising in a housing
   an ocular,
   an objective
   an image reversing system, arranged between said ocular and said objective,
   said ocular and said objective having in common an image plane and a folded optical axis,
   said image reversing system comprising two right angle prisms and being in optical alignment with said ocular and said objective,
   at least one of said prisms being adjustably mounted on said housing,
   a prism mount for receiving said adjustable prism,
   a slide, being rigidly connected to said prism mount,
   a guide being arranged at right angles relative to the part of the optical axis which is in the vicinity of said ocular,
   said slide being displaceable in said guide,
   a seating body being fast with said guide,
   a seating, said seating body being tiltably seated in said seating about an axis of rotation being in parallel with said guide,
   a trunnion being secured to said seating at right angles to said axis of rotation,
   a sliding bearing being connected to said housing,
   said trunnion being rotatably and displaceably arranged in said sliding bearing.

2. A telescope as claimed in claim 1, wherein the sliding bearing is arranged in the extension of the optical axis of the ocular.

3. A telescope as claimed in claim 1, wherein said slide is arrestable relative to said guide, said seating body relative to said seating and the trunnion relative to the sliding bearing.

4. A telescope as claimed in claim 3, wherein said prisms are seated in said prism mounts on five points.

* * * * *